United States Patent
Kauth et al.

(10) Patent No.: US 6,613,868 B2
(45) Date of Patent: Sep. 2, 2003

(54) PROCESS FOR PRODUCING POLYCARBONATES

(75) Inventors: Hermann Kauth, Krefeld (DE); Christian Kords, Krefeld (DE); Jürgen Heuser, Krefeld (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/118,362

(22) Filed: Apr. 8, 2002

(65) Prior Publication Data

US 2002/0151672 A1 Oct. 17, 2002

(30) Foreign Application Priority Data

Apr. 12, 2001 (DE) .......................................... 101 18 307

(51) Int. Cl.$^7$ ................................................ C08G 64/00
(52) U.S. Cl. .......................... 528/196; 528/198; 526/62; 526/63; 526/64; 526/65; 526/67; 526/71
(58) Field of Search ................................. 528/196, 198; 526/62, 63, 64, 65, 67, 71

(56) References Cited

U.S. PATENT DOCUMENTS 5,508,375 A * 4/1996 Hucks et al. ............... 528/199

FOREIGN PATENT DOCUMENTS

| DE | 42 27 372 | 4/1993 |
|---|---|---|
| DE | 195 10 063 | 9/1996 |
| JP | 2-147628 | 6/1990 |
| JP | 3-292340 | 12/1991 |
| JP | 3-292341 | 12/1991 |
| JP | 8-245780 | 9/1996 |

* cited by examiner

Primary Examiner—Terressa M. Boykin
(74) Attorney, Agent, or Firm—Joseph C. Gil; Aron Preis

(57) ABSTRACT

A process for the production of polycarbonate is disclosed. The process, representing an improvement over the known interfacial polycondensation process entails introducing into the loop of a circulating reactor that additionally contains, a residence tank, an optional mixer, a pump, and a heat exchanger (i) an organic phase that contains a solvent for polycarbonate and phosgene and (ii) an aqueous phase that contains an aqueous lye solution, a dihydroxy compound and an optional monophenol to form an emulsion. Maintaining specified temperature and process conditions results in polycarbonate resin having good properties and in waste water that are characterized by their purity.

11 Claims, No Drawings

PROCESS FOR PRODUCING POLYCARBONATES

FIELD OF THE INVENTION

The present invention relates to a process for continuous production of polycarbonates and more particularly to the two-phase interface method.

SUMMARY OF THE INVENTION

A process for the production of polycarbonate is disclosed. The process, representing an improvement over the known interfacial polycondensation process entails introducing into the loop of a circulating reactor that additionally contains, a residence tank, an optional mixer, a pump, and a heat exchanger (i) an organic phase that contains a solvent for polycarbonate and phosgene and (ii) an aqueous phase that contains an aqueous lye solution, a dihydroxy compound and an optional monophenol to form an emulsion. Maintaining specified temperature and process conditions results in polycarbonate resin having good properties and in waste water that are characterized by their purity.

BACKGROUND OF THE INVENTION

The two-phase interface process has been successfully used for many years in the production of polycarbonates. The process permits production of thermoplastic polycarbonates for a range of application areas, such as data carriers (CD, DVD), optical applications or medical applications.

Good heat stability and minimal yellowing are often described as important qualities of the polycarbonate. Less attention has hitherto been paid to the quality of waste water created during polycarbonate production. The contamination of waste water with residual organic materials, such as residual phenols, is of particular importance when considering the further treatment of waste water, for example by a waste treatment plant or by ozonolysis, to oxidize the residual organic materials. There have however been a number of applications in which methods for subsequent waste water treatment with the aim of reducing the content of phenolic components are predominantly described—see, for example: JP 08 245 780 A (Idemitsu); DE 19 510 063 A1 (Bayer); JP 03 292 340 A (Teijin); JP 03 292 341 A (Teijin); JP 02 147 628 A (Teijin).

The contamination of waste water with residual organic materials, for example with bisphenols or phenols, may be kept to a minimum if a large excess of phosgene is used. However, this is not desirable for economic reasons.

When producing polycarbonates with reduced excess phosgene there is the risk that the bisphenol or the monophenol will not all react fully and will contaminate the waste water. There is the further risk that interface-active phenolic OH groups remaining in the polymer will complicate phase separation and washing. Consequently water-soluble impurities may not all be extracted from the organic phase. This may, in turn, adversely affect the quality of the product.

It is maintained that the production of high-quality polycarbonates by a continuous two-phase interface process and simultaneous low contamination of waste water was possible either only with considerable excess phosgene (uneconomical) or with phase separation problems—along with loss in quality of the polycarbonate—or by subsequent treatment of the waste water.

The Applicant's DE-A 42 27 372, disclosed the presently relevant arrangement of apparatus for the process according to the invention. In contrast to the teaching of the invention, however, no teaching may be inferred from DE-A 42 27 372 about the quantities and, in particular, the circulating conditions in which the educts are to be combined, let alone the fact that a particularly low content of residual organic materials, such as phenols and bisphenols, in waste water may be achieved by specially adjusted proportions and circulating conditions.

Starting from DE-A 42 27 372 the object is therefore to provide a process for producing high-quality products at the same time as a low content of organic materials in the waste water.

DETAILED DESCRIPTION OF THE INVENTION

It has now surprisingly been found that very high-quality polycarbonate, measured by the yellowness index and by the terminal phenolic OH group content, is obtained in a continuous process, the process resulting in only low concentration of residual organic materials (residual phenols) in its waste water. In the process, a circulating reactor and at least one tubular reactor that is connected downstream thereof are used as reactor arrangement. Also critical are the specified reaction conditions and the ratio of added starting components to the quantity of circulated reaction emulsion.

A circulating reactor includes a circulating loop, a pump for circulating the reaction emulsion, a heat exchanger and a residence tank. The residence tank is equipped with means for continuous removal of part of the emulsion. The feeding points for the organic phase and the aqueous phase are situated between the residence tank and the pump. In embodiments where an optional mixer is used, these feeding points may be at the mixer.

The "circulating reactor" is also shown schematically for the purpose of better understanding:

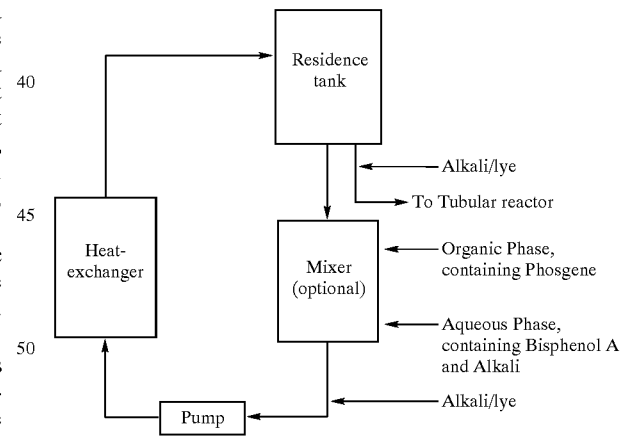

The tubular reactor includes mixing and residence zones and is connected down-stream of the residence tank.

A key feature of the inventive process is the relative purity of the waste water:

The water is characterized in that it contains only low concentration of residual organic materials (residual phenols).

The process is an improvement of the well know two-phase interface process where polycarbonate is prepared from diphenols, phosgene, chain terminators, catalyst and optionally branching agents in a mixture of aqueous/alkaline phase and organic solvent phase. The process entails (a) introducing into the circulating loop of a circulating reactor that additionally contains, in sequence a residence tank, an optional mixer, a pump, and a heat exchanger, through at least one point downstream from the residence tank and up stream from said pump,
  (i) an organic phase that contains a solvent for polycarbonate and phosgene and
  (ii) an aqueous phase that contains an aqueous lye solution, a dihydroxy compound and an optional monophenol to form an emulsion, wherein the temperature throughout the reactor is lower than 60, preferably 55° C. to 25° C., and wherein residence time of the emulsion in the circulating reactor is at least 2, preferably 2 to 15 minutes and
(b) removing from the residence tank a portion of the emulsion and pumping said portion into at least one tubular reactor equipped with at least one mixing zone and at least one residence zone and subjecting said portion to total residence time of 2 to 40 preferably 2 to 30 minutes in the tubular reactor,
with the provisos that
  (aa) the rate at which the total amount of aqueous and organic phases is introduced in (i) relate to the flow rate of the emulsion as 1:3 to 1:12 preferably 1:3 to 1:10 and that
  (bb) the rate of removal of the portion in (b) corresponds to said rate of introduction, and that
  (cc) the molar amount of phosgene introduced to the reaction relates to the theoretical amount that is needed for the reaction of phosgene with dihydroxy compounds and with the optional monophenols as 1.12/1 to 1.22/1, preferably 1.14/1 to 1.20, and that
  (dd) lye in an amount of 15 to 40 preferably 20 to 35 percent relative to the total weight of lye used in the process according to dd) and ee) is introduced into the circulating loop, and that
  (ee) lye in an amount of 85 to 60, preferably 80 to 65 percent relative to the total weight of lye used in the process according to dd) and ee) is introduced into said portion of the emulsion, and that
  (ff) monophenol chain terminator is optionally added into said portion, and that
  (gg) catalyst is added to the said portion after residence time of 1 to 20, preferably 1 to 15 minutes of said portion in the tubular reactor.

"Downstream" and "upstream" are always taken to mean in the flow direction of the emulsion inside the circulating reactor in the present context.

The content of the phenolic component of the untreated waste water of the reaction is less than 100 ppm, preferably less than 50 ppm, particularly preferably less than 20 ppm.

Suitable diphenols are those of formula HO—Z—OH, in which Z is an aromatic radical with 6 to 45 C atoms, which may contain one or more aromatic nuclei, may be substituted and may contain aliphatic radicals or cycloaliphatic radicals or heteroatoms as bridging elements.

Examples are
dihydroxydiphenyls,
bis-(hydroxyphenyl)-alkanes
bis-(hydroxyphenyl)-cycloalkanes
bis-(hydroxyphenyl)-sulphides
bis-(hydroxyphenyl)-ethers
and the compounds thereof, which are alkylated and halogenated in the nucleus.

These and other suitable diphenols are described, for example, in U.S. Pat. Ser. Nos. 3,028,365, 4,982,014, 2,999,835, 3,148,172, 3,275,601, 2,991,273, 3,271,367, 3,062,781, 2,970,131 and 2,999,846, in DE-A 15 70 703, 20 63 050, 20 63 052, 22 11 956, the French patent specification 1 561 518 and in DE-A 38 33 953.

Preferred diphenols are:
2,2-bis-(4-hydroxyphenyl)-propane (Bisphenol-A) and 1,1-bis-(4-hydroxyphenyl)-3,3,5-trimethyl-cyclohexane (TMC-bisphenol).

It is emphasized here that the process according to the invention may be used for virtually all diphenols.

In the process according to the invention the diphenols are used in aqueous alkaline solution, the concentration of diphenols being 10 to 20%, preferably 12.5 to 17.5%, the quantity of alkali being 1.0 to 3.0 mol lye per mol bisphenol and being dependent on the solubility of the bisphenol used.

The phosgene is used in organic solvents in a concentration of 7 to 10%, preferably 8 to 9.5%

Suitable chain terminators and branching agents are known. Examples of suitable chain terminators are disclosed in DE-A 38 33 953. Preferred chain terminators are phenol, cumylphenol, isooctylphenol, para-tert.-butylphenol. The chain terminators may be added neat or in various concentrations as a solution in organic solvents.

Preferred branching agents are trisphenols and tetraphenols and 3,3-bis-(3-methyl-4-hydroxyphenyl)-2-oxo-2,3-dihydroindol. The branching agents may also be added neat or in various concentrations as a solution in organic solvents.

Sodium hydroxide solution or potassium hydroxide solution are used as lye, and alkaline-earth lyes may optionally also be used. Aqueous sodium hydroxide solution is preferred. The concentration of the NaOH in the aqueous sodium hydroxide solution corresponds to that of commercially available lyes, in other words between 20 and 60%, preferably between 30 and 50%, most particularly preferred is sodium hydroxide solution obtained directly from the amalgam or diaphragm process of the chlorine-alkali electrolysis at concentrations of about 50 or 32% respectively.

All percentages in the present context are taken to mean wt. % unless explicitly stated otherwise.

In principle, any catalysts known for producing polycarbonates by the two-phase interface process, such as tert.amines, may be used as catalysts. N-ethyl-piperidine and triethylamine are preferred.

The organic phase contains solvents or a solvent mixture which dissolves polycarbonate. Suitable solvents are any known solvents which are capable of dissolving the polycarbonate to at least 5 wt. % at temperatures of about 20° C., and mixtures thereof.

Methylene chloride, toluene, monochlorobenzene are preferred, methylene chloride and mixtures of methylene chloride and monochlorobenzene in a ratio of 20:80 parts by weight to 75:25 parts by weight being particularly preferred.

A pH between 9 and 14, preferably between 9.5 and 13.0, is adjusted throughout the reaction. This is effected in that the quantity of lye required to dissolve the diphenols is introduced once at the start, then the lye is first subsequently added upstream of the heat exchanger and is subsequently added upstream of the tubular reactors, optionally together with the chain terminator.

The polycarbonates may be processed in a known manner to form any molded articles, and additives, such as stabilizers, mold-release agents or flame retardants, fillers or glass fibers, conventional in thermoplastic polycarbonates, may be added before or during processing.

The polycarbonates obtained by the process according to the invention may be used industrially in a known manner as any molded articles or even sheets and films, for example in the automotive industry or in optical applications, optical and magneto-optical storage media.

The following applications are mentioned by way of example but without being limiting:

1. Safety screens, required, as is well known, in many areas of buildings, vehicles and aeroplanes, and as helmet visors.
2. Producing foils, in particular ski foils.
3. Producing blown articles (see for example U.S. Pat. No. 2,964,794), for example 1 to 5 gallon water bottles.
4. Producing light-permeable panels, in particular hollow chamber panels, for example for covering buildings such as railway stations, glass houses and lighting installations.
5. Producing optical data memories.
6. For producing traffic light casings or traffic signs.
7. For producing foamed materials (see for example DE-B 1 031 507).
8. For producing filaments and wires (see for example DE-B 1137 167 and DE-A 1 785 137).
9. As translucent plastics materials with a glass fiber content for lighting engineering purposes (see for example DE-A 1 554 020).
10. As translucent plastics materials with a barium sulphate, titanium dioxide and/or zirconium oxide content or organic polymeric acrylate rubbers (EP-A 634 445, EP-A 269 324) for producing light-permeable and light-scattering molded parts.
11. For producing precision injection molded particles, such as lens holders. For this purpose polycarbonate with a glass fiber content, optionally additionally containing about 1 to 10 wt. % $MoS_2$, based on the total weight, is used.
12. For producing optical apparatus components, in particular lenses for photo-cameras and film cameras (see for example DE-A 2 701 173).
13. As light transmission carriers, in particular as optical fiber cables (see for example EP-A1 0 089 801).
14. As electric insulating materials for electric conductors and for connector casings and connectors.
15. Production of mobile phone casings with improved resistance to perfume, aftershave and perspiration.
16. Network interface devices.
17. As carrier materials for organic photoconductors.
18. For producing lights, for example headlights, as so-called head-lamps, light scattering discs or inner lenses.
19. For medical applications, for example oxygenators, dialysers.
20. For foodstuff applications, such as bottles, kitchenware and chocolate molds.
21. For applications in the automotive sector, where contact with fuels and lubricants can occur, such as bumpers, optionally in the form of suitable blends with A-BS or suitable rubbers.
22. For sports articles, such as slalom poles or ski boot bindings.
23. For household articles, such as kitchen sinks and letterbox casings.
24. For housings, such as distribution cabinets.
25. Casings for electric toothbrushes and hairdryers.
26. Transparent washing mach in e portholes with improved resistance to the washing solution.
27. Safety glasses, optical correcting glasses.
28. Light coverings for kitchen appliances with improved resistance to kitchen vapour, in particular oil vapors.
29. Packaging films for pharmaceutical preparations.
30. Chip boxes and chip carriers.
31. For other applications, such as barn doors or animal cages.

The following examples are intended to illustrate the present invention without, however, limiting it thereto.

EXAMPLES

Example 1

24,000 kg/h of an alkaline bisphenol A solution containing 15 wt. % BPA and 2.1 mol sodium hydroxide solution per mol BPA were introduced into a circulating reactor, via a T-section upstream of the pump, along with 1,848 kg/h phosgene dissolved in 20,400 kg/h solvent consisting of 50 wt. % methylene chloride and 50 wt. % monochlorobenzene, via a further T-section.

To maintain the alkalinity of 360 kg/h of 32% sodium hydroxide solution were added and the reaction mixture conveyed via a heat exchanger and an unstirred storage container back to the pump, where the above-mentioned streams of material were added.

A circulated quantity of 286,000 kg/h (260 $m^3$/h) was determined by measurement.

The temperature was 36° C.

A portion of the emulsion equivalent to the incoming raw materials was conveyed to a further pump upstream of the adding points for BPA and phosgene from the residence tank and was pumped through a tubular reactor. 1,050 kg/h sodium hydroxide solution (32 wt. %) and 134 kg/h p-tert.-butylphenol, dissolved in 536 kg solvent mixture, were added to this stream. After a residence time of 10 min 18 kg/h N-ethylpiperidine in the form of a 4.8% solution in a solvent mixture (50 parts methylene chloride and 50 parts monochlorobenzene) were added and the emulsion pumped through a further tubular reactor by a further pump.

After a residence time of a further 10 min the emulsion was separated in a separating vessel and the polycarbonate solution washed free of electrolytes by known processes, for example by centrifuging.

The polycarbonate solution was concentrated in evaporation units and freed from residual solvent on an evaporation extruder.

The following were measured in the aqueous phase from the separating vessel:
Total BPA/PHE*=10 ppm
The water content in organic phase** was 0.25%

* total free BPA and phenols, measured by UV spectroscopy of the aqueous phase at 294 nm, for example in a Perkin-Elmer spectrometer
** the water content of the organic phase from the separating vessel was determined by titration by the Karl Fischer process.

The following analytical data was determined on the polycarbonate granules:
YI=1.35*
rel eta=1.195**
phenolic OH=85 ppm***

* measured to ASTM E 313
** measured to ISO 1628/4
*** measured by UV spectroscopy at 546 nm after colour reaction of the terminal phenolic groups with $TiCl_4$

Example 2

27,000 kg/h of an alkaline bisphenol A solution containing 15 wt. % BPA and 2.1 mol sodium hydroxide solution per mol BPA were introduced into a circulating reactor consisting of heat exchanger with circulating loop via a T-section upstream of a pump, along with 2,090 kg/h phosgene dissolved in 24,300 kg/h solvent consisting of 50 wt. % methylene chloride and 50 wt. % monochlorobenzene, via a further T-section.

To maintain the alkalinity, 460 kg/h 32% sodium hydroxide solution were added and the reaction mixture conveyed via a heat exchanger and an unstirred residence tank back to the pump, where the above-mentioned streams of material were added.

A circulated quantity of 297,000 kg/h (270 m$^3$/h) was determined by measurement.

The temperature was 38° C.

A portion of the emulsion equivalent to the incoming raw materials was conveyed to a further pump upstream of the adding points for BPA and phosgene from the residence tank and was pumped through a tubular reactor. 1,120 kg/h sodium hydroxide solution (32 wt. %) and 151 kg/h p-tert.-butylphenol, dissolved in 604 kg solvent mixture, were added to this stream. After a residence time of 9 min 23 kg/h N-ethylpiperidine in the form of a 5.3% solution in a solvent mixture (50 parts methylene chloride and 50 parts monochlorobenzene) were added and the emulsion pumped through a further tubular reactor by a further pump.

After a residence time of a further 9 min the emulsion was separated in a separating vessel and the polycarbonate solution washed free of electrolytes by known processes, for example by centrifuging.

The polycarbonate solution was concentrated in evaporation units and liberated from residual solvent on an evaporation extruder.

The following were measured in the aqueous phase from the separating vessel:
BPA/PHE=20 ppm The water content in the organic phase was 0.21%

The following analytical data were determined on the polycarbonate granules:
YI=1.38
rel eta=1.197
phenolic OH=70 ppm Example 3

35,000 kg/h of an alkaline bisphenol A solution containing 15 wt. % BPA and 2.1 mol sodium hydroxide solution per mol BPA were introduced into a circulating reactor via a T-section upstream of the pump, along with 2,730 kg/h phosgene dissolved in 29,750 kg/h solvent consisting of 50 wt. % methylene chloride and 50 wt. % monochlorobenzene, via a further T-section.

To maintain the alkalinity, 520 kg/h 32% sodium hydroxide solution were added and the reaction mixture conveyed via a heat exchanger and an unstirred storage container back to the pump, where the above-mentioned streams of material were added.

A circulated quantity of 286,000 kg/h (260 m$^3$/h) was determined by measurement.

The temperature was 38° C.

A portion of the emulsion equivalent to the incoming raw materials was conveyed to a further pump upstream of the adding points for BPA and phosgene from the storage container and was pumped through a tubular reactor. 1,540 kg/h sodium hydroxide solution (32 wt. %) and 193 kg/h p-tert.-butylphenol, dissolved in 772 kg solvent mixture, were added to this stream. After a residence time of 7 min 28 kg/h N-ethylpiperidine in the form of a 5.1% solution in a solvent mixture (50 parts methylene chloride and 50 parts monochlorobenzene) were added and the emulsion pumped through a further tubular reactor by a further pump.

After a residence time of a further 7 min the emulsion was separated in a separating vessel and the polycarbonate solution washed free of electrolytes by known processes, for example by centrifuging.

The polycarbonate solution was concentrated in evaporation units and freed from residual solvent on an evaporation extruder.

The following were measured in the aqueous phase from the separating vessel:
BPA/PHE=15 ppm The water content in the organic phase was 0.19%

The following analytical data were determined on the polycarbonate granules:
YI=1.35
rel eta=1.196
phenolic OH=80 ppm Example 4

35,000 kg/h of an alkaline bisphenol A solution containing 15 wt. % BPA and 2.1 mol sodium hydroxide solution per mol BPA were introduced into a circulating reactor via a T-section upstream of the pump, along with 2,730 kg/h phosgene dissolved in 29,750 kg/h solvent consisting of 50 wt. % methylene chloride and 50 wt. % monochlorobenzene, via a further T-section.

To maintain the alkalinity, 520 kg/h 32% sodium hydroxide solution were added and the reaction mixture conveyed via a heat exchanger and an unstirred residence tank back to the pump, where the above-mentioned streams of material were added.

A circulated quantity of 660,000 kg/h (600 m$^3$/h) was determined by measurement.

The temperature was 38° C.

A portion of the emulsion equivalent to the incoming raw materials was conveyed to a further pump upstream of the adding points for BPA and phosgene from the storage container and was pumped through a tubular reactor. 1,540 kg/h sodium hydroxide solution (32 wt. %) and 193 kg/h p-tert.-butylphenol, dissolved in 772 kg solvent mixture, were added to this stream. After a residence time of 7 min 28 kg/h N-ethylpiperidine in the form of a 5.1% solution in a solvent mixture (50 parts methylene chloride and 50 parts monochlorobenzene) were added and the emulsion pumped through a further tubular reactor by a further pump.

After a residence time of a further 7 min the emulsion was separated in a separating vessel and the polycarbonate solution washed free of electrolytes by known processes, for example by the centrifuging.

The polycarbonate solution was concentrated in evaporation units and freed from residual solvent on an evaporation extruder.

The following were measured in the aqueous phase from the separating vessel:
BPA/PHE=10 ppm The water content in the organic phase was 0.26%

The following analytical data were determined on the polycarbonate granules:
YI=1.40
rel eta=1.194
phenolic OH=85 ppm Comparison Example 1

The proportions of BPA, phosgene and NaOH correspond to those in DE-A 4 227 372 in which nothing is disclosed regarding circulating rates.

As described in Example 1 but, instead of 360 kg/h NaOH 32%, 435 kg/h NaOH 32% were now added into the circulating reactor and, instead of 1,050 kg/h, 975 kg/h NaOH 32% were now added downstream of the circulating reactor to the removed portion of the emulsion before entering the tubular reactor. Instead of 1,848 kg/h phosgene, 1,900 kg/h were added.

In addition, the circulated quantity was 110,000 kg/h (100 m$^3$/h) instead of 286,000 kg/h (260 m$^3$/h).

Therefore neither the ratio between the flow rate of the emulsion and the added amounts of raw materials nor the ratio between BPA and Phosgene correspond to the claimed process.

The following were measured in the aqueous phase from the separating vessel:
BPA/PHE=210 ppm
The water content in the organic phase was 1.2%
The following analytical data were determined on the polycarbonate granules:
YI=1.9
rel eta=1.190
phenolic OH=170 ppm Comparison Example 2

As described in Example 1 but, instead of 360 kg/h NaOH 32%, 910 kg/h NaOH 32% were now added into the circulating reactor and, instead of 1,050 kg/h, 500 kg/h NaOH 32% were now added downstream of the circulating reactor to the removed portion of the emulsion before entering the tubular reactor.

Therefore the distribution of added NaOH does not correspond the claimed process.

The following were measured from the separating vessel in the aqueous phase:
BPA/PHE=150 ppm The water content in the organic phase was 1.5%
The following analytical data were determined on the polycarbonate granules:
YI=1.8
rel eta=1.193
phenolic OH=160 ppm Comparison Example 3

As described in Example 1 but the circulated quantity was 825,000 kg/h (750 m$^3$/h) here instead of 286,000 kg/h (260 m$^3$/h), the sodium hydroxide solution was distributed equally as in comparison example 1.

Therefore the ratio between the flow rate of the emulsion and the added amounts of raw materials does not correspond to the claimed process.

The following were measured from the separating vessel in the aqueous phase:
BPA/PHE=120 ppm
The water content in the organic phase was 1.8%
The following analytical data were determined on the polycarbonate granules:
YI=1.8
rel eta=1.191
phenolic OH=140 ppm Comparison Example 4

As described in Example 1, but only 1,720 kg/h phosgene were added.

Therefore the ratio between BPA and Phosgene does not correspond to the claimed process.

The following were measured from the separating vessel in the aqueous phase:
BPA/PHE=750 ppm
The water content in the organic phase was 2.5%
The following analytical data were determined on the polycarbonate granules:
YI=2.1
rel eta=1.189
phenolic OH=340 ppm From these experimental results it is to be taken, that only the specific combination of conditions according to the claimed process lead to the surprising result of low content of phenolic compounds in the untreated waste water. Therefore the claimed process is clearly new and inventive.

What is claimed is:

1. A continuous process for producing polycarbonate comprising
   (a) introducing into the circulating loop of a circulating reactor that additionally contains, in sequence a residence tank, an optional mixer, a pump, and a heat exchanger, through at least one point downstream from the residence tank and up stream from said pump,
      (i) an organic phase that contains a solvent for polycarbonate and phosgene and
      (ii) an aqueous phase that contains an aqueous lye solution, a dihydroxy compound and an optional monophenol
   to form an emulsion, wherein the temperature throughout the reactor is lower than 60 C. and wherein residence time of the emulsion in the circulating reactor is at least 2 minutes and
   (b) removing from the residence tank a portion of the emulsion and pumping said portion into at least one tubular reactor equipped with at least one mixing zone and at least one residence zone and subjecting said portion to total residence time of 2 to 40 minutes in the tubular reactor,
   with the provisos that
      (aa) the rate at which the total amount of aqueous and organic phases is introduced in (i) relate to the flow rate of the emulsion as 1:3 to 1:12 and that
      (bb) the rate of removal of the portion in (b) corresponds to said rate of introduction, and that
      (cc) the molar amount of phosgene introduced to the reaction relates to the theoretical amount that is needed for the reaction of phosgene with dihydroxy compounds and with the optional monophenols as 1.12/1 to 1.22/1, and that
      (dd) lye in an amount of 15 to 40 percent relative to the total weight of lye used in the process according to dd) and ee) is introduced into the circulating loop, and that
      (ee) lye in an amount of 85 to 60 percent relative to the total weight of lye used in the process according to dd) and ee) is introduced into said portion of the emulsion, and that
      (ff) monophenol chain terminator is optionally added into said portion, and that
      (gg) catalyst is added to the said portion after residence time of 1 to 20 minutes of said portion in the tubular reactor.

2. The process of claim 1 wherein the temperature throughout said circulatory reactor is 55° C. to 25° C.

3. The process of claim 1 wherein the residence time of the emulsion in the circulating reactor is 2 to 15 minutes.

4. The process of claim 1 wherein the portion is subjected to total residence time of 2 to 30 minutes in the tubular reactor.

5. The process of claim 1 wherein the rate at which the total amount of aqueous and organic phases is introduced in (i) relate to the flow rate of the emulsion 1:3 to 1:10.

6. The process of claim 1 wherein the molar amount of phosgene introduced to the reaction relates to the theoretical amount that is needed for the reaction of phosgene with dihydroxy compounds and with the optional monophenols as 1.14/1 to 1.20.

7. The process of claim 1 wherein the amount of lye introduced into the circulating loop is 20 to 35 percent relative to the total weight of lye used in the process.

8. The process of claim 1 wherein the amount of lye introduced into said portion is 80 to 65 percent relative to the total weight of lye used in the process.

9. The process of claim 1 wherein monophenol chain terminator is added into said portion.

10. The process of claim 1 wherein catalyst is added to said portion after residence time of 1 to 15 minutes of said portion in the tubular reactor.

11. The process of claim 1 wherein the untreated waste water has a phenolic compounds content of below 100 ppm.

* * * * *